United States Patent [19]

Maldonado et al.

[11] 4,375,974
[45] Mar. 8, 1983

[54] DETERGENT COMPOSITIONS, THEIR MANUFACTURE AND THEIR USE AS ADDITIVES FOR FUELS

[75] Inventors: Paul Maldonado, Saint Symphorien D'Ozon; Choua Cohen; Bernard Sillion, both of Lyons, all of France

[73] Assignees: Institut Francais du Petrole, Rueil-Malmaison; Societe Elf France, Paris, both of France

[21] Appl. No.: 281,532

[22] Filed: Jul. 8, 1981

[30] Foreign Application Priority Data

Jul. 8, 1980 [FR] France ............................ 80 15228

[51] Int. Cl.³ .......................... C10L 1/18; C10L 1/22
[52] U.S. Cl. ........................................ 44/63; 44/71;
526/272; 252/51.5 A; 525/382; 525/386
[58] Field of Search ............... 44/63, 71; 252/57.5 A;
525/382, 386; 526/272

[56] References Cited

U.S. PATENT DOCUMENTS

| | | | |
|---|---|---|---|
| 3,131,150 | 4/1964 | Stuart et al. | 252/51.5 A |
| 4,121,026 | 10/1978 | Cheng et al. | 44/71 |
| 4,163,645 | 8/1979 | Cheng et al. | 44/71 |
| 4,203,730 | 5/1980 | Hanson | 44/71 |
| 4,240,803 | 12/1980 | Andress | 44/71 |

*Primary Examiner*—Jacqueline V. Howard
*Attorney, Agent, or Firm*—Millen & White

[57] ABSTRACT

A nitrogen-containing composition, useful as a detergent for gasoline, is obtained by reacting at least one unsaturated anhydride with at least one olefin to convert 20–80% of the anhydride and thereafter reacting the resultant product with a polyamine of the general formula

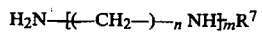

wherein $R^7$ is a monovalent aliphatic radical of 6–30 carbon atoms, n is an integer from 2 to 5 and m is an integer from 1 to 10.

16 Claims, No Drawings

DETERGENT COMPOSITIONS, THEIR MANUFACTURE AND THEIR USE AS ADDITIVES FOR FUELS

BACKGROUND OF THE INVENTION

This invention concerns detergent compositions, their manufacture, their use as additives for gasolines and the resultant improved gasoline compositions which possess good anti-rust and detergent properties as concerns the carburator and the admission systems. These detergent compositions are characterized by the fact they are obtained by reacting a specific polyamine with a complex mixture resulting from the partial condensation of an unsaturated anhydride with an olefin.

Irregular idling and motor stalling have long been known as problems associated with the running of motor cars operated with carburators.

A reason why irregular idling and stalling occur is the accumulation of deposits on the throttle valve of the carburator and on the surrounding walls. This accumulation of deposits disturbs the normal flow of air through the carburator, thus leading to rich fuel mixtures. The deposits can result, for example, from the accumulation of impurities or dust from the air or from the recycling of crank-case gas.

On the other hand, these too rich fuel mixtures do not burn completely, so that the air pollution increases with the content of partially unburnt fuel particles.

Modern carburators of high capacity have a complex structure. Even though few deposits and residues are present, their presence in the fine control parts of these carburators greatly disturbs the operation thereof, thus resulting in an unsatisfactory composition of the fuel/air mixture so that the $CO/CO_2$ ratio increases.

This can be remedied either by an expensive periodical cleaning of the carburator and the heads of the admission valves, or by increasing the normal idling speed, which results in a greater difficulty for driving the vehicle and an unnecessary increase of the fuel consumption.

It is known that the deposits in the carburator can be reduced or the accumulation of these deposits can be inhibited by using fuels containing additives called detergents for carburators.

In addition to the detergent additives for carburators, the modern fuels necessitate other additives to improve the behaviour of the fuel, for example those which provide for an anti-rust protection and a limitation of the deposits in the admission system. The additives are preferably multi-functional additives.

Although a number of multi-functional additives have been proposed in the art, many of them are not acceptable, either since they have undesirable effects or must be used in excessive amounts, to obtain the desired properties.

U.S. Pat. No. 3,920,698 discloses nitrogen compounds having excellent detergent, anti-corrosion and anti-frost effects. However the products mentioned in this patent do not fully eliminate the deposits formed on the hot surfaces of the admission circuit.

OBJECTS OF THE INVENTION

The present invention has for object to provide a type of additive having multi-functional properties, including anti-rust properties and detergent properties for the carburator, producing no detrimental deposit on the valves and other hot parts of the admission pipe, and operative at a concentration usually comprised between 10 and 500 ppm by weight of the hydrocarbon mixture, these limits bringing no limitation.

SUMMARY OF THE INVENTION

As a rule, the products of the invention can be defined as those obtained by reacting a polyamine with a complex mixture resulting from the partial condensation of an unsaturated anhydride with an olefin (R), the anhydride being preferably used in excess. In this definition, complex mixture is intended to include all the reaction products of the anhydride with the olefin, the anhydride in excess and its transformation products, if any.

DETAILED DISCUSSION

The olefins which can be used in this invention may be linear or branched. They usefully comprise at least 10 carbon atoms per molecule and preferably 20 to 200 carbon atoms per molecule.

The unsaturated anhydrides can comply with the following general formulae:

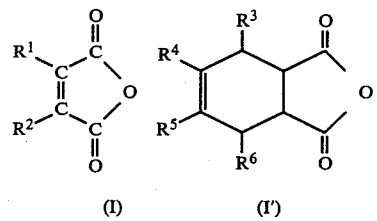

(I)  (I')

wherein $R^1$ and $R^2$ are identical or different and are selected from the hydrogen atom and the monovalent hydrocarbon radicals of 1 to 30 carbon atoms (preferably 1 to 12 carbon atoms). $R^4$ and $R^5$ are hydrogen atoms or monovalent hydrocarbon radicals comprising 1 to 5 carbon atoms, and $R^3$ and $R^6$ are either a hydrogen atom or form together a 1 or 2 carbon endo alkylene bridge.

The linear polyamines are of the following general formula:

$$H_2N\text{-}[(CH_2)_n\text{-}NH]_m R^7 \qquad (II)$$

wherein $R^7$ is a linear or branched, saturated or unsaturated aliphatic radical comprising 6 to 30 carbon atoms; n is an integer from 2 to 5 and m is an integer from 1 to 10.

One of the characteristics of the invention is the control of the reaction of the olefin R with the anhydride of formula I or I' in such a manner that this reaction is not complete; there remains at unconverted end of the reaction an excess of 20–80%, preferably 30–70% of the starting anhydride of formula (I) or (I').

Particularly advantageous examples of useful long chain olefins are:
polymers mainly based on $C_2$ to $C_5$ mono-olefin units, for example, ethylene, propylene, butylene, isobutylene and pentene. They can be homopolymers, such as polyisobutylene, or copolymers of two or several of these olefins, for example ethylene and propylene, butylene and isobutylene, propylene and isobutylene copolymers.
copolymers of $C_2$ to $C_5$ mono-olefins wherein a minor proportion of the monomers, for example 1 to 20 mole %, consists of an unconjugated $C_4$ to $C_{18}$ di-olefin, for example a copolymer of isobutylene with 1,2-butadiene, or a copolymer of ethylene with propylene and 1,4-hexadiene, and the like.

oligomers with a terminal olefinic group obtained by cracking polymers having the above defined structures.

Particlarly advantageous examples of maleic anhydrides of the formula (I) are:
maleic anhydride itself
mono- and dimethyl maleic anhydride
mono- and diethyl maleic anhydride
mono- and dipropyl maleic anhydride
mono- and di-isopropyl maleic anhydride
mono- and di-dodecyl maleic anhydride.

Examples of anhydrides of the formula (I') are:
tetrahydrophthalic anhydride
endomethylene tetrahydrophthalic anhydride
methyl nadic anhydride.

Useful linear polyamines of the formula (II) are, for example:
N-oleyl propane diamine
N-stearyl propane diamine
N-isostearyl propane diamine
N-oleyl dipropylene triamine
N-stearyl dipropylene triamine
N-isostearyl dipropylene triamine
mixtures of two or more of the above amines.

The products of the invention can be prepared by condensing the reactants in two steps.

In the first step, the olefin (R) is condensed with an excess of the anhydride of the formula (I) or (I'), the operation being so conducted that 20 to 80%, preferably 30 to 70%, of the starting anhydride (I) or (I') remains unconverted at the end of this step. In the second step, the mixture resulting from the first step is reacted with an amine of the formula (II).

The first step can be effected with or without solvent, preferably without solvent. The reaction temperature is normally between 140° and 250° C. and preferably between 160° and 230° C. The first step is usefully effected in 2 to 24 hours, preferably in 4 to 8 hours. The anhydride of formula (I) or (I') is normally employed in a proportion of 1 to 2.5 moles, preferably 1.1 to 1.5 moles, per mole of olefin. In the case of a polymer, olefin mole is intended to represent the average molecular weight by number.

The second step of manufacture of the detergent compositions is the reaction of the amine (II) with the first step reaction mixture. It can be effected without solvent, although the use of an aromatic hydrocarbon of boiling point between 70° and 250° C. is preferred, for example: toluene, xylenes, diisopropyl benzene or an aromatic cut having the desired distillation range. The operation is preferably effected as follows: the polyamine is introduced stepwise while the temperature is maintained below 80° C. and preferably below 40° C.; the temperature is then raised to 120°–200° C. to eliminate resultant water, either by stripping with an inert gas, such as nitrogen or argon, or by azeotropic distillation with the selected solvent. The second step, after addition of the polyamine, usefully takes from 2 to 8 hours, preferably from 3 to 6 hours. The polyamine of the formula (II) is normally employed in a proportion of 0.9 to 1.2 mole, preferably 1.0 to 1.1 mole, per mole of anhydride (I) or (I') used in the first step.

These products are used as additives for fuels. They have the advantage to possess multi-functional properties; they have surfactive properties and good film-forming properties; they confer to the metallic surfaces an improved resistance to corrosion; they also have a sufficient heat stability to not contribute themselves to the formation of deposits and they inhibit, in view of their film-forming properties at high temperature, the deposits normally formed by the particles of lubricating oil or the aromatic or olefinic products decomposed by heat.

The products of the invention may be used in the motor fuels at concentrations of, for example, 10 to 500, preferably 20 to 300 parts per million (ppm) by weight, without cloud formation, even at low temperature, and they can be associated without disadvantage with conventional additives. The motor fuels concerned are gasolines for spark-ignition engines, whose constituents distill between 30° and 210° C. in a proportion of at least 90%.

The following examples illustrate the invention but are not considered as limitation thereof.

EXAMPLE 1

185 g (0.2 mole) of liquid polyisobutene having a molecular weight of 920 and 25.7 g (0.26 mole) of maleic anhydride are introduced into a stirred reactor of a 1000 cc capacity. The mixture is heated and stirred at 196° C. for 6 hours. At this moment it is determined by UV spectrometry at 290 nanometers that 0.14 mole of maleic anhydride has not reacted (conversion rate of maleic anhydride: 46%).

At the end of this first step, the temperature is decreased and the reaction mixture is diluted with 210 g of xylene. A solution of 93 g (0.26 mole) of a diamine of the trade (mol. weight: 357), mainly comprising N-oleyl 1,3-propane diamine, in 70 g of xylene is then added at room temperature to the stirred reaction mixture, while limiting the temperature of the mixture to at most 40° C. during the addition.

After addition of the amine, the mixture is stirred at the reflux of xylene for 3 hours with azeotropic extraction of water formed in the course of the latter step.

At the end of this second step, 4.7 ml (0.26 mole) of water is recovered in the extractor, which corresponds to one mole of water per anhydride group supplied to the reaction mixture.

A brown-red reaction mixture is recovered, whose active material content in xylene is 51%.

EXAMPLE 2

The operating conditions are those of example 1, except that the amount of maleic anhydride supplied to the first step is 0.36 mole and the amount of oleyl propane diamine supplied to the second step is 0.36 mole.

EXAMPLE 3

The operating conditions are the same as in example 1, except that the first step is effected in diisopropylbenzene, no solvent having been used in example 1. For that, 140 g of diisopropylbenzene is added in the first step; at the end of the first step, only 70 g of xylene is added for dilution. The second step is operated as in example 1.

EXAMPLE 4

The operating conditions are those described in example 1, except that xylene used as solvent in the second step is replaced by an aromatic petroleum cut having the following properties:
specific gravity at 15° C.: 0.8765

Distillation at the pressure of 759 mm (AST-M—D—850)
initial point: 161° C.
final point: 185° C.
Inflammation point in closed vessel (ASTM—D—56): 43° C.

EXAMPLE 5

The operating conditions are the same as in example 1, except that polyisobutene supplied to the first step is replaced by 33.6 g (0.2 mole) of tetrapropylene.

EXAMPLE 6

185 g (0.2 mole) of liquid polyisobutene of a molecular weight of 920 and 46.8 g (0.3 mole) of tetrahydrophthalic anhydride are introduced into a stirred reactor of a 1000 cc capacity equipped with a heating system. The stirred mixture is heated for 6 hours at 196° C. At the end of this first step (rate of conversion of the anhydride: 47%), the temperature is decreased and the reaction mixture is diluted with 232 g of the petroleum cut described in example 4. A solution of 97.5 g (0.3 mole) of N-oleyl 1,3-propane diamine in the same solvent is then added at room temperature while maintaining the temperature of the stirred mixture below 60° C. during the addition.

After addition of the amine, the mixture is heated at reflux for 3 h with azeotropic extraction of water formed in the latter step. 5.4 ml (0.3 mole) of water is collected, which corresponds to one mole of water formed per anhydride group introduced into the reaction mixture. The additive is obtained as a solution in the petroleum cut at a concentration of about 50% by weight.

EXAMPLE 7

The operating conditions are those of example 2, except that the 0.36 mole of oleyl propane diamine are replaced with 0.36 mole of N-isostearyl dipropylene diamine.

A solution of about 50% b.w. of additive is obtained in the same manner.

EXAMPLE 8

Example 6 is repeated, except that tetrahydrophthalic anhydride is replaced by 40.6 g (0.26 mole) of nadic anhydride and oleyl propane diamine by 85 g (0.26 mole) of N-isostearyl 1,3-propane diamine. 4.7 ml of water are collected. The resultant solution of additive has a concentration of about 50% by weight.

EXAMPLE 9

Example 6 is repeated by replacing tetrahydrophthalic anhydride with 63.7 g (0.35 mole) of methyl nadic anhydride and oleyl propane diamine with 114.5 g (0.35 mole) of N-stearyl 1,3-propane diamine. 6.3 ml of water are collected (0.35 mole). The resultant solution of additive has a concentration of about 50% by weight.

The conversion rate of the anhydride during the first step was respectively 44%, 46%, 54%, 47%, 38,5% and 40% in Examples 2, 3, 5, 6, 8 and 9.

TESTS WITH THE PRODUCTS

The products prepared as described in examples 1 and 2 have been used as additives for gasolines, and the performances of the additive-containing gasolines have been tested as described below:

(a) Heat stability according to the ISD procedure

The ISD procedure (Induction System Deposit) is applied according to the laboratory method of the Southwest Research Institute (San Antonio, Texas) by A. A. JOHNSTON and E. DIMITROFF, SAE Transaction, vol. 75, p. 885–891, Article 660 783 (1969).

It is used to determine the heat stability of a solution of additive in premium gasoline, by simulating its passing along the hot surfaces of a running motor, particularly on the admission valves.

The products of Examples 1 and 2 are added to the premium gasoline at a concentration of 250 ppm by weight. The results are given in Table I. The results abtained with premium gasoline containing 100 ppm of an additive A of the trade are also given.

TABLE I

| TESTED PRODUCTS | TESTS DEPOSITS ON THE HEATED SURFACES AT 200° C. IN mg (TESTS ISD) |
|---|---|
| Premium gasoline + compound of example 1 (250 ppm) | 0 |
| Premium gasoline + compound of example 2 (250 ppm) | 0.1 |
| Premium gasoline + additive of the trade A (100 ppm) | 1.8 |

The compounds of examples 3, 4 and 5 have resulted in a deposit of less than 0.2 mg in test ISD.

(b) Corrosion test

The products of examples 1 and 2 have been used in premium gasoline at a concentration of 100 ppm by weight.

The corrosion test consists of corroding cylindrical test pieces of polished ordinary steel with synthetic sea water, according to the modified ASTM D665 standard (temperature of 32.2° C.; 20 hours).

The results are given in Table II, which also gives the comparative results obtained with premium gasoline without additive and premium gasoline containing an additive B of the trade at the same concentration of 100 ppm by weight.

TABLE II

| TESTED PRODUCTS | TESTS CORROSION % |
|---|---|
| Premium gasoline without additive | 100 |
| Premium gasoline + compound of example 1 (100 ppm) | 0.1 |
| Premium gasoline + compound of example 2 (100 ppm) | 0 |
| Premium gasoline + additive B of the trade (100 ppm) | 95 |

Other tests have been effected with the products of examples 3 to 5 and superficial corrosion rates of from 0.1 to 5% have been observed.

(c) Carburator fouling bench test

The carburator fouling bench test is effected according to the ELF/IFT BNPe R5 GTL method.

The method consists of estimating on a motor bench the capacity of a fuel to maintain a carburator clean.

The test lasts 12 hours and comprises 2 periods of 6 hours separated by a 18 hours standstill. The fouling of the carburator is accelerated by recycling a fraction of the exhaust gas to the admission.

A technique of visual inspection of the carburator body expressed the results as a mark from 0 to 10.
- 10 corresponds to a new carburator.
- 0 to a fouled carburator.

The mark takes into account the existence, the shade and the position of the deposits in the carburator and on the admission throttle valve.

The products of examples 1 and 2 have been used in a proportion of 250 ppm by weight of the premium gasoline. The results are given in Table III which also states, by way of comparison, the results obtained with the premium gasoline without additive and the premium gasoline containing an additive B of the trade at a concentration of 276 ppm by weight.

TABLE III

| TESTED PRODUCTS | MOTOR TESTS CARBURATOR SOILING FINAL RATING/10 |
|---|---|
| Premium gasoline without additive | 3.0 |
| Premium gasoline + compound of example 1 (250 ppm) | 8.1 |
| Premium gasoline + compound of example 2 (250 ppm) | 8.1 |
| Premium gasoline + additive B of the trade (276 ppm) | 7.45 |

(d) Bench test for admission valve fouling

The bench test for admission valve fouling is applied according to the method of the Research and Development Department, Deutsche BP Aktiengesellschaft, Hamburg.

It has for object to determine, on the test bench, the capacity of additive-containing premium gasolines to maintain the admission valves clean. The test is effected on a 1.25 Opel Kadett engine equipped with a double carburator. This allows the simultaneous testing either of one additive at two different concentrations, or of two different additives or of an additive-containing premium gasoline compared with an additive-free premium gasoline. The test simulates a sequential run at normal speed, at idling and at 35, 50 and 80 km per hour.

The bench test program is the following:
Test duration: 40 hours.
30 seconds of idling at 1000 r.p.m.
1 minute at 3000 r.p.m. (corresponding to 80 km per hour)
1 minute at 1300 r.p.m. (corresponding to 35 km per hour)
1 minute at 1850 r.p.m. (corresponding to 50 km per hour).

At the end of the test, the condition of the admission valve heads is estimated by the milligrams of deposit per valve, to compare the additive-containing fuel with the fuel alone.

The products prepared in examples 1 and 3 have been used in a proportion of 250 ppm of the premium gasoline weight. The results are given in Table IV which also states the results obtained with the additive-free premium gasoline and those obtained with the premium gasoline containing an additive A of the trade, in a concentration of 167 ppm by weight.

TABLE IV

| TESTED PRODUCTS | MOTOR TESTS SOILING OF THE ADMISSION VALVES IN mg DEPOSIT PER VALVE |
|---|---|
| Premium gasoline without additive | 256–287 |
| Premium gasoline + compound of example 1 (250 ppm) | 82 |
| Premium gasoline + compound of example 3 (250 ppm) | 99 |
| Premium gasoline + additive A of the trade (167 ppm) | 259 |

The products of examples 4 to 9 have been tested in the same conditions: they also have good detergent properties and inhibit the fouling of the valves.

What is claimed is:

1. A detergent fuel additive composition prepared by a process comprising the steps of:
   (a) partially condensing a linear or branched $C_{10-200}$ olefin with an unsaturated anhydride having the formula

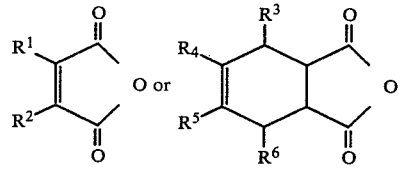

wherein $R^1$ and $R^2$ are each independently H or $C_{1-30}$ hydrocarbyl; $R^4$ and $R^5$ are each independently H or $C_{1-5}$ hydrocarbyl; and $R^3$ and $R^6$ are each H or together form an endo $C_{1-2}$ alkylene bridge; wherein 1–2.5 moles of unsaturated anhydride per mole of olefin are heated at a temperature of 140°–250° C., the reaction being interrupted when 20–80% of the anhydride has been converted; and
   (b) reacting the resultant complex mixture from step (a), containing residual unconverted anhydride, at 120°–200° C., with a polyamine having the formula $H_2N\text{-}[\text{-}(CH_2)_n NH]_m\text{-}R^7$, wherein $R^7$ is a $C_{6-30}$ aliphatic group; n is an integer from 2 to 5; and m is an integer from 1 to 10; wherein 0.9–1.2 mole of said polyamine is used per mole of said unsaturated anhydride introduced into step (a), and removing the resultant water.

2. A composition according to claim 1, wherein step (a) is effected without a solvent.

3. A composition according to claim 1, wherein in step (a), the reaction temperature is 160°–230° C.

4. A composition according to claim 1, wherein the olefin used in step (a) is a homopolymer or a copolymer of ethylene, propylene, butylene, isobutylene or pentene, or an oligomeric terminal olefin produced by cracking said homopolymer or copolymer.

5. A composition according to claim 1, wherein the olefin used in step (a) is a copolymer of $C_{2-5}$ monoolefins containing 1–20 mole % of an unconjugated $C_{4-18}$ diolefin, or an oligomeric terminal olefin produced by cracking said copolymer.

6. A composition according to claim 1, wherein step (b) is effected in an aromatic hydrocarbon solvent having a boiling point of 70°–250° C.

7. A composition according to claim 1, wherein in step (b), the polyamine is introduced into said complex reaction mixture at a temperature below 80° C., and the temperature is then raised to 120°-200° C.

8. A composition according to claim 1, wherein in step (b), the resultant water is stripped with an inert gas.

9. A composition according to claim 6, wherein in step (b), the resultant water is removed by azeotropic distillation with said solvent.

10. A composition according to claim 1, wherein in step (b), 1.0-1.1 mole of said polyamine per mole of anhydride is used.

11. In a method for improving the performance of a spark ignition internal combustion engine by adding to the gasoline fuel for said engine a multi-function detergent additive, the improvement wherein said additive is a composition according to claim 1.

12. A composition according to claim 1, wherein in step (a), from 1.1 to 1.5 mole of unsaturated anhydride is used per mole of olefin.

13. A composition according to claim 1, wherein the olefin comprises 20 to 200 carbon atoms.

14. A composition according to claim 1, wherein the unsaturated anhydride used in step (a) is maleic anhydride, monomethyl-, dimethyl-, monoethyl-, diethyl-, monopropyl-, dipropyl-, monoisopropyl-, diisopropyl-, monododecyl- or didodecyl- maleic anhydride, tetrahydrophthalic anhydride, endomethylene tetrahydrophthalic anhydride, methyl nadic anhydride or a mixture thereof; and the polyamine used in step (b) is N-oleyl propane diamine, N-stearyl propane diamine, N-isostearyl propane diamine, N-oleyl-dipropylene triamine, N-stearyl dipropylene triamine, N-isostearyl dipropylene triamine or a mixture thereof.

15. A fuel composition comprising a major proportion of at least one motor gasoline and a proportion of 10 to 500 ppm by weight of at least one detergent additive composition according to claim 1.

16. A fuel composition according to claim 15, wherein the proportion of said detergent additive is 20 to 300 ppm by weight.

* * * * *